United States Patent
Liao

(10) Patent No.: US 12,204,575 B2
(45) Date of Patent: Jan. 21, 2025

(54) METHOD FOR UPDATING AND DISPLAYING INFORMATION AND AN ALIVE PATENT MAP THEREOF

(71) Applicant: Kuang-Yang Liao, Taichung (TW)

(72) Inventor: Kuang-Yang Liao, Taichung (TW)

( * ) Notice: Subject to any disclaimer, the term of this patent is extended or adjusted under 35 U.S.C. 154(b) by 296 days.

(21) Appl. No.: 17/863,887

(22) Filed: Jul. 13, 2022

(65) Prior Publication Data
US 2023/0017544 A1    Jan. 19, 2023

(30) Foreign Application Priority Data
Jul. 16, 2021   (TW) ................................ 110126267

(51) Int. Cl.
| | | |
|---|---|---|
| *G06F 16/335* | (2019.01) | |
| *G06F 16/332* | (2019.01) | |
| *G06F 16/338* | (2019.01) | |
| *G06F 16/34* | (2019.01) | |

(52) U.S. Cl.
CPC ........ *G06F 16/335* (2019.01); *G06F 16/3326* (2019.01); *G06F 16/338* (2019.01); *G06F 16/345* (2019.01); *G06F 2216/11* (2013.01)

(58) Field of Classification Search
CPC .. G06F 16/335; G06F 16/3326; G06F 16/338; G06F 16/3338; G06F 16/345; G06F 2216/11
USPC ................................................. 707/706, 748
See application file for complete search history.

(56) References Cited

U.S. PATENT DOCUMENTS

| | | | | |
|---|---|---|---|---|
| 2015/0081657 A1* | 3/2015 | Yi | ........................ | G06F 16/3338 |
| | | | | 707/706 |
| 2016/0004768 A1* | 1/2016 | Barney | ................... | G06F 16/95 |
| | | | | 707/749 |

FOREIGN PATENT DOCUMENTS

| | | | | | |
|---|---|---|---|---|---|
| JP | 2001092851 A | * | 4/2001 | ............. | G06F 16/93 |
| JP | WO-2006115260 A1 | * | 11/2006 | ............ | G06F 16/338 |

OTHER PUBLICATIONS

JP-2001092851-A, "Data Processing for Patent Analysis, Automatic Patent Map Generating Method, and Recording Medium for Storing Program for It" Inventor: Kin Biko, Cho Sanko, RI Seikei, Published Apr. 6, 2001 English Translation Version. (Year: 2001).*
WO-2006115260-A1, "Device for Automatically Creating Information Analysis Report, Program for Automatically Creating Information Analysis Report, and Method for Automatically Creating Information Analysis Report" Inventor: Masuyama Hiroaki, Published Nov. 2, 2006 English Translation Version (Year: 2006).*

* cited by examiner

*Primary Examiner* — Shahid A Alam
(74) *Attorney, Agent, or Firm* — Best & Flanagan LLP

(57) ABSTRACT

The present invention provides a method for updating and displaying information, which comprises a matrix program that operates as a program to analyze a data list and to form a table separately by setting a plurality of keywords, then produce an alive matrix map after the analysis result is matched and the table is created; therefore, the alive matrix map can add new data lists without repeating the tedious setting steps.

15 Claims, 4 Drawing Sheets

METHOD FOR UPDATING AND DISPLAYING INFORMATION AND AN ALIVE PATENT MAP THEREOF

FIELD OF INVENTION

A method for displaying information, in particular, for updating and displaying information and an alive patent map thereof.

BACKGROUND OF THE INVENTION

The most common method of producing a patent map is to set multiple keywords on a horizontal axis and a vertical axis, then many patent documents are used to process the designation and classification corresponding to those keywords which were set on the horizontal axis and vertical axis, and then to display the information of the patent documents resulted in an intersection column corresponding to the horizontal axis and the vertical axis, to complete a patent matrix chart.

In the current method, when producing the patent map, the keywords are set and designated on the horizontal axis and the vertical axis manually, and using a computer to filter several patent documents according to the keywords, then forming the patent matrix chart with the filtering results. However, after the patent matrix chart is created, it is not only impossible to revise, filter and limit the filtering conditions, but also difficult to add other patent documents at a later time, because it is still needed to set the keywords manually on the horizontal and vertical axes again to obtain a new patent matrix chart. A repeated implementation of the processes is labor-intensive and time-consuming.

SUMMARY OF THE INVENTION

To overcome the technical problem of the current method, including impossible to revise, filter, and limit the filtering conditions after the patent matrix chart is made, and having to recreate a new matrix chart when it needs to add some patent documents at a later time. The present invention provides a method for updating and displaying information, and its steps include:

determine the keywords to form a keyword group. Inputting a plurality of keywords into a matrix program to be analyzed to form at least one keyword group;

select at least one data list. Selecting the data list to be analyzed, which contains a plurality of documents;

analyze the data list. The patent matrix program analyzes the data list according to each of the keyword groups and displays an analyzing result;

create a table in which the keyword groups are distributed on a horizontal axis and a vertical axis. The matrix program displays the keyword groups on the horizontal axis and the vertical axis of the table respectively, by the settings, to form multiple horizontal categories and vertical categories, wherein the intersection of the horizontal categories and the vertical categories forms a plurality of intersection columns, and match the data list to create an alive matrix map. The matrix program performs the matching with the intersected keyword groups corresponding to the horizontal and vertical categories, then produces a matching result to display in the intersection column.

The present invention also provides an alive patent map, which contains at least one filtering unit, each filtering unit contains at least one filtering condition, and the patent matrix program creates a matching result to display on the intersection column based on the filtering unit and filtering condition.

The present invention provides a method for updating and displaying information, in which the steps of analyzing the data list and forming the alive matrix map will not interfere with each other, so the matrix program will not affect the analysis result when changing the setting of the table. Since the analysis of the data list conducted by the matrix program is operated independently, so the alive map doesn't need to be reset repeatedly by cumbersome steps when it needs to add some new data lists to the matrix program routinely. In addition, because a word module stores synonyms, antonyms, and other correlations among the words, the user can save as much time as possible in entering multiple keywords and further obtain a well-improved alive matrix map. Since the matrix program has perfectly analyzed the data information in the data lists, so even when the filtering conditions are changed, the matrix program does not need to match with the documents again, which avoids the processes of analysis, filtering, and matching repeatedly in the matrix program, and can save much of time.

DETAILED DESCRIPTION OF THE PREFERRED EMBODIMENTS

Figure 1:
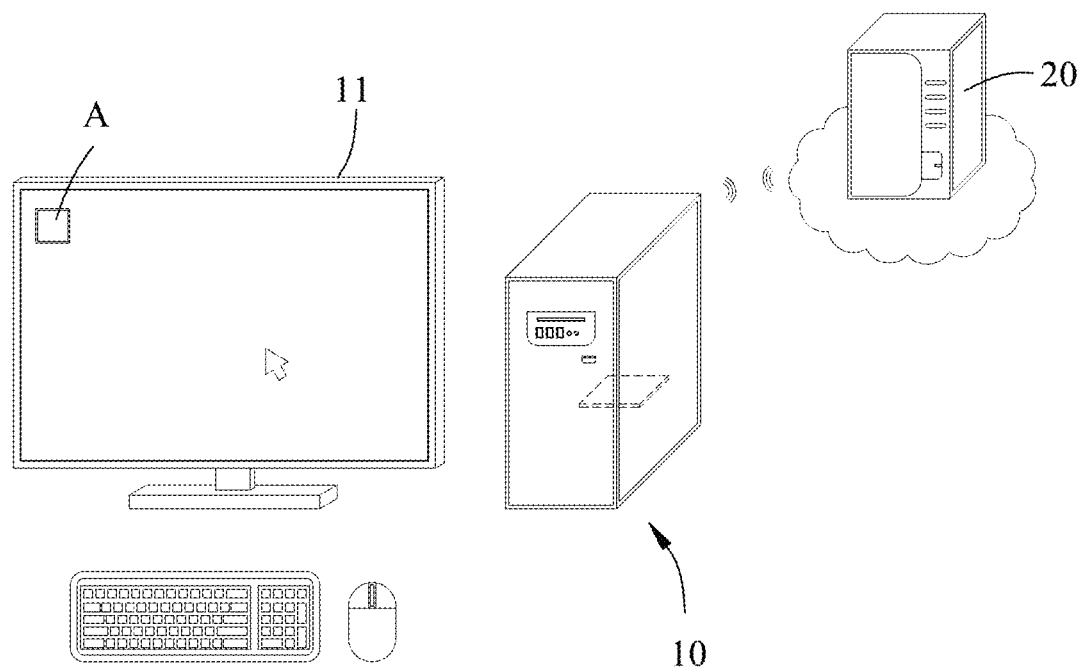
FIG. 1 is a diagram schematically showing the system of the preferred embodiment of the present invention.
Figure 2:
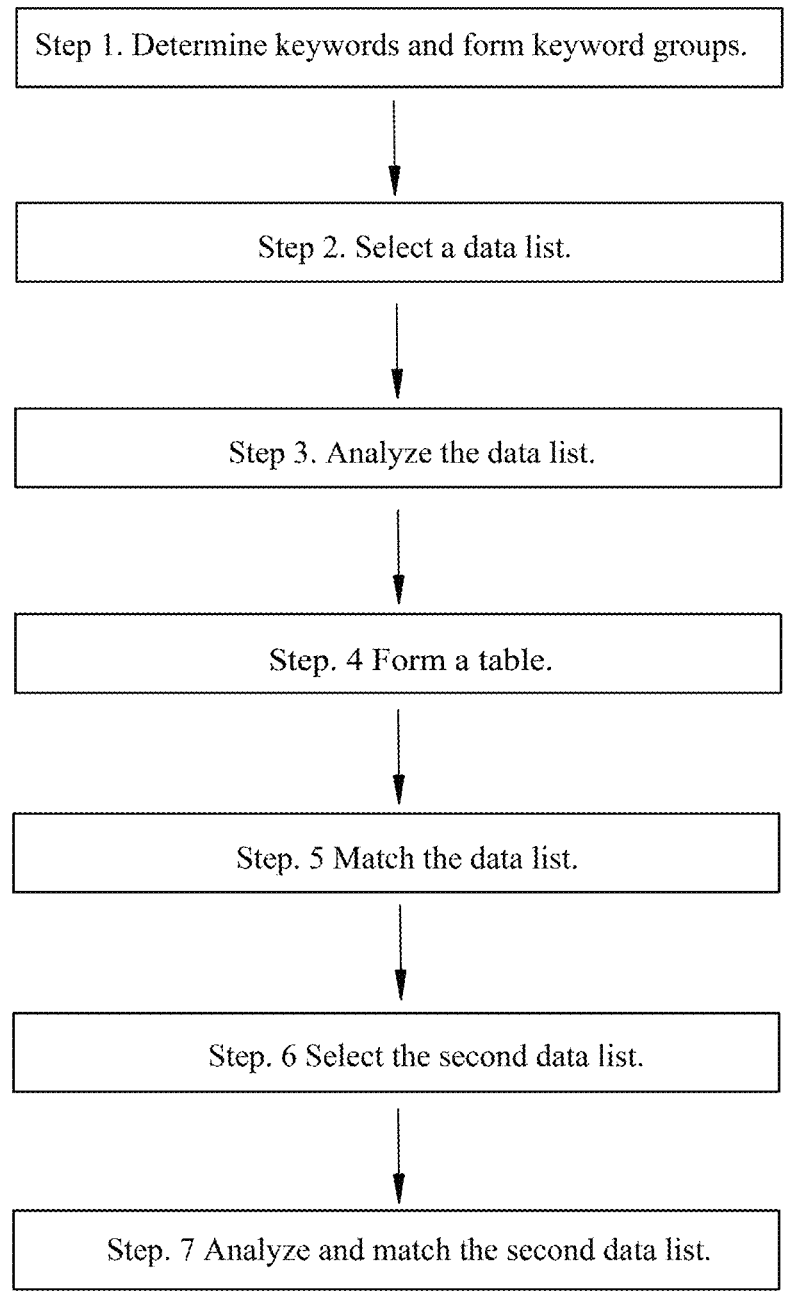
FIG. 2 is a flow chart schematically showing the steps of the preferred embodiment of the present invention.
Figure 3:
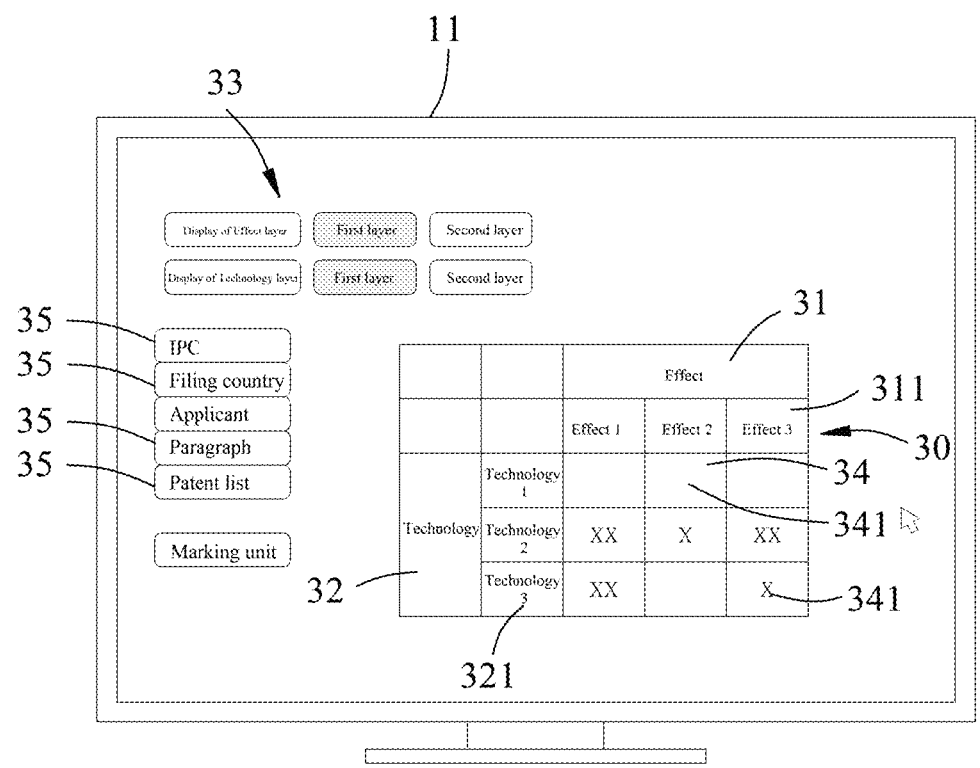
FIG. 3 is a diagram schematically showing the first pattern of the preferred embodiment of the present invention.

Referring to FIGS. 1 to 3, which are preferred system embodiments of a method for updating and displaying information provided by the present invention, comprising a remote device 10, which may be a handheld or wearable mobile device, a personal computer having a Central Processing Unit (CPU) (as shown), a notebook computer, or a smartphone. The remote device 10 may execute a matrix program A, which can be a network interface or an application program (APP) stored in the remote device 10, and the matrix program A is connected via the Internet to a database 20, which may have been installed in the matrix program A originally or connected with the matrix program A externally. Wherein, the database 20 can be a patent database, a business database, a legal document database, etc.

The matrix program A creates an alive matrix map 30 on a display interface 11 of the remote device 10, the alive matrix map 30 contains plural keywords distributed in at least two axes, where the alive matrix map 30 is formed by matching each keyword with at least one document B in a data list, and analyzes the intersected keywords shown in the two axes, then statistically calculates the amount which the intersected keywords have existed in the document B and then displays the result of the amount; and analyzes the intersected keywords in at least one document B of a second data list, then statistically calculates the amount which the intersected keywords have existed in the document B and then displays the result of the amount. In this preferred embodiment, the first and second data lists are not all duplicated, but preferably the second data list can be relatively new. In other words, by continuously importing relatively new data, the imported data will be analyzed to see if it matches the plural keywords, and finally displayed in the form of a matrix. The so-called not-all-duplicate means partly the same and partly different; or the document B of the first data list and the second data list are in different states, such as in different legal states, taking patent documents or judgments as an example, a case corresponds to a public and announcement documents of document B, or the price of the stock at different times.

Please refer to FIG. 2, which is the method for updating and displaying information provided by the present invention, the steps of which include:

Step 1: Determine keywords and form keyword groups, inputting multiple keywords to be analyzed into the matrix program A according to an analysis subject, preferably, the matrix program A contains a word module that stores vocabulary data of at least one language, the vocabulary data stores synonymy, antonymy or other correlations among the words, by using the word module, the matrix program A can display simultaneously with synonyms, antonyms, or other correlative vocabularies when input a keyword, so those vocabularies can be added to the analysis selectively, due to the multiple keywords and vocabularies are entered to combine as a keyword group for use. The present invention does not limit to having only one keyword group, but can have multiple keyword groups that can be created by classifying the process of keywords and/or vocabularies when required.

The way that the word module stores synonyms, antonyms, or other correlations among words can be set by manual method, or based on the vocabularies that often accompany the keywords input every time, the word module will record the keywords and vocabularies that accompany each other and their frequency of occurrence to further define their relevance. For example, when the keyword "plate" is entered, the matrix program A will display several words such as "block", "sheet", "film", etc. as well as the frequency of occurrence according to the previous records. Meanwhile, the user can also optionally use the operand, such as AND, OR, and NOT between the keyword and/or vocabulary to form a keyword group by way of the logical operation formula.

Step 2: Select a data list. Please refer to FIG. 4, selecting a data list to be analyzed from the database 20 according to the analysis subject, wherein the data list includes at least one document B. If the database 20 is connected to the matrix program A externally, where the data list can also be input into the matrix program A by the way of import, the data list input by way of importing would be formed as a list listed in the document B.

Step 3: Analyze the data list. After the data list is selected, the matrix program A will analyze the data list according to each keyword group and display an analysis result showing the area and number of keywords and/or vocabularies appearing in each document B. Preferably, the analysis result can be displayed in a list, e.g., when using each document B as a unit, a sequential list that contains paragraphs where each keyword or vocabulary appears or the number of times of appearing will be listed in such document B; or when each keyword or vocabulary is used as a unit, a sequential list that contains all documents B with each keyword or vocabulary will be listed in such document B; or when the keyword group is used as a unit, a sequential list that contains all documents B that matches with the keyword groups will be listed in such document B.

Step 4: Form a table. Please refer to FIGS. 3 and 4, dispatch the keyword groups into the horizontal axis 31 and vertical axis 32, then the matrix program A will display each keyword group in the horizontal axis 31 and vertical axis 32 from the table according to the setting; when the horizontal axis 31 has been distributed the selected keyword groups, it will generate a plurality of horizontal axis categories 311 at the horizontal axis 31, likewise, when the vertical axis 32 has been distributed the selected keyword groups, it will generate a plurality of vertical axis categories 321 at the vertical axis 32, wherein the table thereby will form a plurality of intersection columns 34 between the horizontal axis category 311 and vertical axis category 321. The horizontal axis 31 and the vertical axis 32 can be set with a name in the matrix program A, such as product, effect, technology, or component as needed. In this embodiment, the name of the horizontal axis 31 is set as "Effect", then the names listed in the column of each horizontal axis category 311 will be named as "Effect 1" and "Effect 2" subsequently, and the name of the vertical axis 32 is set as "Technology", then the names listed in the column of each vertical axis category 321 will be named as "Technology 1", "Technology 2" subsequently.

Preferably, each keyword group can be further divided into a plurality of main keyword groups and sub-keyword groups as needed, so that a layer relationship will be formed between each keyword group. Based on the layer relationship, the plurality of horizontal axis categories 311 and vertical axis categories 321 will be further divided into plural horizontal axis main categories 311A and horizontal axis sub-categories 312, and plural vertical axis main categories 321A and vertical axis sub-categories 322. For example, when the plurality of main keyword groups are distributed to the table, the plural horizontal axis main categories 311A and vertical axis main categories 321A will therefore be defined as a first layer, when a plurality of sub-keyword groups are distributed to each corresponding horizontal axis main category 311A and vertical axis main category 321A, the plural horizontal axis sub-categories 312 and vertical axis sub-categories 322 will be formed and which will be defined as a second layer.

wherein, since this step only sets the arrangement and layer relationship for each keyword group in the table, it will not affect the procedure of analyzing the data list in Step 3, so this step can be executed after Step 1, and it's not limited to do so after Step 3.

Step 5: Match the data list to form an alive matrix map 30. The matrix program A sets the position of each keyword group in the table, further performs a match to create a matching result 341 according to the analysis results, then the matrix program A matches with each keyword group in the corresponding horizontal axis category 311 and vertical axis category 321, then displays the documents B that matched with the matching result 341 in the intersection column 34. Therefore, to display the document B in one of the intersection columns 34, it is necessary to match with the keyword groups of the horizontal axis category 311 and the vertical axis category 321 that corresponds to each other.

Step 6: Select the second data list. A method provided by the present invention can further add a second data list in the analysis subject according to requirements, however, it is not necessary for the alive matrix map 30 to re-execute the aforementioned Steps 1 and 4, so the cumbersome setting steps can be omitted. As for the execution of Steps 6 and 2, the repetitious details need not be given here.

Step 7: Analyze and match the second data list. The matrix program A executes Steps 3 and 5 according to the keyword groups, performs an analysis and matching with the second data list directly, and displays the matching result 341 in the corresponding intersection column 34, therefore, the alive matrix map 30 provided by the present invention can be used to analyze and match the second data directly, it is not necessary to re-analyze and re-match the data list which was set originally, this enables the alive matrix map 30 to update the data more effectively, and will not cause a burden for the matrix program A because of analysis and matching repeatedly.

Further, the first data list and the second data list can also be selected at the same time, and the results will be displayed on the alive matrix map 30.

The method for updating and displaying information provided by the present invention can be widely applied to any field. For example, when the invention is applied to the field of patent searching, the database 20 can be a patent database, and the matrix program A analyzes the patent list that contains at least one patent document according to the set keywords or keyword groups, and form an alive patent map (alive matrix map 30). While analyzing the data list, the matrix program A can classify a data document in accordance with the patent documents simultaneously. The document may include the information of an International Patent Classification number, a Cooperative Patent Classification number, an applicant, an inventor, a payment date, a laid-open date, a publication date, a filing country, and a case status, such as pending examination, under examination, under re-examination, rejection, approval, abandonment, expiration, etc.

Wherein, the first data list and the second data list are different at least in some conditions, for example, the publication date of each patent document in the first data list is different from the same in the second data list. Preferably, the data of the patent documents in the first data list do not overlap with the data of the patent documents in the second data list.

The present invention can also be applied in the field of legal search. Wherein, the database 20 can be a legal database, and the matrix program A analyzes the data list containing at least one legal document according to the set keywords or keyword groups, the information of the legal document can be a complaint, a judgment, or any public document related to the law or litigation history, the matrix program A forms an alive legal map (alive matrix map 30) after matching the data list. While analyzing the data list, matrix program A can simultaneously classify the document information in accordance with those legal documents, and the document information can be a judgment date, a citation, a participating attorney, a participating judge, a type of lawsuit, a public date, a disposition unit, and a case status, such as an indictment, under mediation, under trial, judgment, appeal, etc.

Wherein, the first data list and the second data list are different at least in some conditions, for example, each legal document in the data list is a case in the first trial, while each legal document in the second data list is a case in the second trial.

The present invention can also be applied to the field of academic search. Wherein the database 20 can be a database of academic journals, and the matrix program A analyzes the data list containing at least one academic journal document according to the set keywords or keyword groups, and the matrix program A forms an alive journal map (alive matrix map 30) after matching the data list. While analyzing the data list, matrix program A can simultaneously classify the document information in accordance with the academic journal documents, the document information can be a date of publication, a journal category, a country of filing, a scholarly field, an inventor, etc.

Wherein, the first data list and the second data list are different at least in some conditions, for example, the academic journal document in the data list is a document published in the first half of the year, while the academic journal document in the second data list is a document published in the second half of the year.

Figure 4:
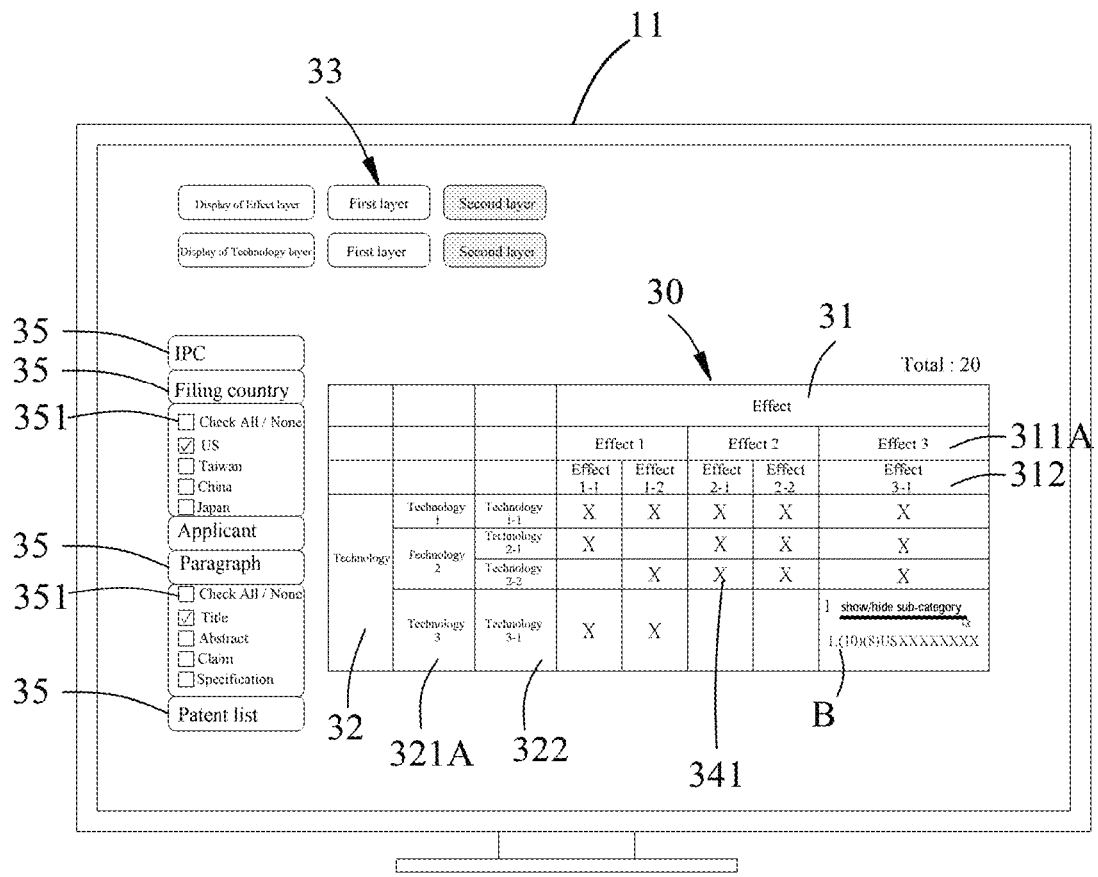
FIG. 4 is a diagram schematically showing the second pattern of the preferred embodiment of the present invention.

Please refer to FIG. 3 and FIG. 4, for a preferred embodiment of the method provided by the present invention when applied to the patent search field, where an alive matrix map 30 (alive patent map) is displayed on the display interface 11. The alive matrix map 30 comprises a horizontal axis 31, a vertical axis 32, and at least one filtering unit 35. The horizontal axis 31 and the vertical axis 32 separately form a plurality of horizontal axis categories 311 and vertical axis categories 321 corresponding to the selected keyword groups. Likewise, the horizontal axes 311 and the vertical axes 321 can optionally form a plurality of horizontal axis main categories 311A, horizontal axis sub-categories 312, vertical axis main categories 321A and vertical axis sub-categories 322, depending on the requirement. In the same way, each horizontal axis main category 311A or horizontal axis sub-category 312 and each vertical axis main category 321A or vertical axis sub-category 322 are intersected each other to form an intersection column 34. When the alive patent map 30 includes such layer relationships, the layer number of the horizontal axis 31 and the vertical axis 32 can be selectively displayed through a layer unit 33, i.e., the vertical axis sub-categories 312 or the vertical axis sub-categories 322 can be selectively displayed or hidden.

Each intersection column 34 displays a matching result 341 individually, and the matrix program A creates such matching result 341 and displays on each intersection column 34 corresponding to the keyword groups selected by the horizontal axis 31 and the vertical axis 32, and the display can be a result of none or with many documents B. When it is displayed as none, it means that none of the document B matches with the keyword groups corresponding to the horizontal category 311 and vertical category 312, where the display of the matching result 341 is not limited to "none", but can also be the number of "0" or other markers, symbols or patterns. When a plurality of documents B are displayed, it means that the documents B appearing in the intersection column 34 all contain the keywords in the keyword groups corresponding to the horizontal category 311 and vertical category 312, and how documents B are displayed in the intersection column 34 is not limited but can be displayed as a number representing the total number of the documents, or directly display a plurality of the documents B in the intersection column 34. In this embodiment, when the document B is a patent document, each document B can be displayed in the intersection column 34 by a patent number or a patent name, and the intersection column 34 can optionally display a number that represents the total number of the documents B, or display a list of the documents B by clicking on the number. Further, the documents B displayed in the intersection column 34 may also contain a hyperlink that can be clicked to link directly to the database 20 and display the corresponding documents B text or related information on the display interface 11.

Please refer to FIGS. 3 and 4, the filtering unit 35 includes at least one filtering condition 351, and the matrix program A forms a matching result in the intersection column 34 according to the filtering unit 35 and the filtering condition 351. The information of the filtering unit 35 or the filtering condition 351 can be formed according to the document information classification or be set manually. In this embodiment, when the document B is a patent document, the filtering unit 35 can categorize the document information as an International Patent Classification number, a Cooperative Patent Classification number, an applicant, an inventor, a date of payment, a laid-open date, a publication date, a filing country, or a combination of the above to be the filtering condition 351.

The filtering unit 35 can also arrange a timetable for the matrix program A, so that the alive matrix map 30 can just display the filtering result of the document B in one of the patents lists only. In addition, each filtering unit 35 can also be filtered by correlation, for example, by selecting the main keywords that correspond to the horizontal axis 31 and the vertical axis 32, and displaying only the specific paragraphs corresponding to the document B, such as the title, claim, hidden, the text of the specification or the number of occurrences as the filtering condition 351.

Since the matrix program A has already classified the patent list according to the document information in the process of Step 3, therefore, when changing and setting a new filter condition 351, the patent program A will perform filtering and matching directly according to the analysis result and display it directly in the intersection column 34, there is no need to classify the document B again, which not only avoid the analysis repeatedly by the matrix program A but also save the operation time.

When the filtering condition 351 is changed in the setting, the matrix program A performs an analysis on the documents B by filtering condition 351, and eliminates the documents B which do not match with the filtering unit 35 and filtering condition 351, then displays the filtering result in the intersection column 34. For example, when the document B is a patent document, the date of publication is used as the filtering unit 35, then the filtering condition 351 can be the year, and the matrix program A then performs the filtering according to the year of publication from the documents B. Thus, when a single year is selected as the filtering condition 351, the matrix program A will display the filtering results that meet the filtering condition 351 in the intersection column 34. For another example, if a country is selected as the filtering unit 351, then filtering condition 351 can be the countries of the United States, China, Japan, etc., the matrix program A then performs the filtering to the countries according to the filing countries in the documents B and selects one of the countries as the filtering condition 351, the matrix program A then displays the filtering results that meet the filtering condition 351 in the intersection column 34. In addition, the filtering condition 351 can be set at the same time or in stages so that the matrix program A can flexibly display the alive matrix map 30 according to the filtering condition 351.

The filtering results are displayed in the intersection column 34 using the same way as matching results 341. When none is displayed, it means that the document B meets the matching results 341 but does not meet the filtering condition 351. When a plurality of documents B is displayed, it means that the documents B appearing in the intersection column 34 not only meet the matching result 341 but also meet the filtering condition 351.

The alive matrix map 30 and the method provided by the present invention will not affect each other in the steps of analyzing the patent list according to the keyword and forming the table, so the matrix program A will not affect the analysis result when changing the setting of the table as well. Also, because the matrix program A executes and analyzes the data list as an independent operation, the alive matrix map and the method to generate it can add new data lists based on the timetable and do not have to repeat the tedious setting steps; the word module stores synonyms, antonyms, and other correlations among words which enables the users to save much of time in entering keywords and obtain a well-improved alive matrix map 30. Since the matrix program A has already performed an analysis of the documents in the data list in Step 3, when the setting of the filtering condition 351 is changed, the matrix program A does not need to analyze the document B again, which avoids the processes of analysis repeatedly in the matrix program A and can save much of operation time.

What is claimed is:

1. A method for updating and displaying information, performed by a matrix program of a computer, comprising the steps of:

providing an alive matrix map comprising plural keywords distributed in at least two axes, analyzing at least one document in a first data list using the keywords located in the two axes, statistically calculating the resulting amount of the intersected keywords which have existed in at least one document and displaying them on an alive matrix map; and analyzing at least one document in a second data list by using the keywords, calculating the resulting amount of the intersected keywords which have existed in at least one document, and displaying them on an alive matrix map, wherein the matrix program distributes the keywords in at least two axes and forms a table;

wherein the matrix program analyzes the data list according to the keywords and displays the result of the analysis; and wherein the matrix program performs a match and analysis with the intersected keywords in accordance with the two axes, and the result of the matching and analysis is displayed in an intersection column formed by the two axes.

2. The method for updating and displaying information according to claim 1, comprising an importing step, wherein the alive matrix map accepts the importing step and analyzes the second data list with keywords, wherein, at least one condition of the second data list is partially different from the first data list.

3. The method for updating and displaying information according to claim 2, wherein the matrix program accepts a filtering condition, and the patent matrix program creates a filtering result according to that filtering condition and updates the result in the intersection column.

4. The method for updating and displaying information according to claim 3, wherein the matrix program comprising a word module storing vocabulary data of at least one language, the vocabulary data storing synonyms, antonyms, or correlations among the words, and the word module displaying the vocabularies of synonyms, antonyms or other correlations based on the keyword input.

5. The method for updating and displaying information according to claim 4, wherein the word module records the frequency of occurrence for the keywords input together with its accompanying words, and that frequency of occurrence is defined as a correlation.

6. An alive patent map which is produced by the method described in claim 3, comprising at least one filtering unit, and at least one selected filtering condition, the matrix program creating a filtering result according to the filtering condition, and the filtering result being displayed in an intersection column formed by two axes.

7. The alive patent map according to claim 6, wherein the filtering unit contains the information of an International Patent Classification number, a Collaborative Patent Classification number, an applicant, an inventor, a payment date, a laid-open date, a publication date, a filing country or a combination of the above, and that information listed above can be one or more filtering condition, or the filtering unit is at least one patent list selected in the patent matrix program, or the filtering unit is a specific paragraph of the patent document corresponding to the keyword, or the number of occurrences for the keyword, and those also can be set as the filtering condition, or the alive patent map includes a layer relationship consisting of a plurality of main categories which defined as a first layer, and a plurality of sub-categories which defined as a second layer, and a layer unit that can optionally show or hide the sub-categories respectively.

8. The method for updating and displaying information according to claim 2, wherein the matrix program comprising a word module storing vocabulary data of at least one language, the vocabulary data storing synonyms, antonyms, or correlations among the words, and the word module displaying the vocabularies of synonyms, antonyms or other correlations based on the keyword input.

9. The method for updating and displaying information according to claim 8, wherein the word module records the frequency of occurrence for the keywords input together with its accompanying words, and that frequency of occurrence is defined as a correlation.

10. The method for updating and displaying information according to claim 1, wherein the matrix program comprising a word module storing vocabulary data of at least one language, the vocabulary data storing synonyms, antonyms, or correlations among the words, and the word module displaying the vocabularies of synonyms, antonyms or other correlations based on the keyword input.

11. The method for updating and displaying information according to claim 10, wherein the word module records the frequency of occurrence for the keywords input together with its accompanying words, and that frequency of occurrence is defined as a correlation.

12. An alive patent map which is produced by the method described in claim 10, the alive patent map comprising at least one filtering unit, and at least one selected filtering condition, the matrix program creating a filtering result according to the filtering condition, and the filtering result being displayed in an intersection column formed by two axes.

13. The alive patent map according to claim 12, wherein the filtering unit contains the information of an International Patent Classification number, a Collaborative Patent Classification number, an applicant, an inventor, a payment date, a laid-open date, a publication date, a filing country or a combination of the above, and that information listed above can be one or more filtering condition, or the filtering unit is at least one patent list selected in the patent matrix program, or the filtering unit is a specific paragraph of the patent document corresponding to the keyword or the number of occurrences for the keyword, and those also can be set as the filtering condition, or the alive patent map includes a layer relationship consisting of a plurality of main categories which defined as a first layer, and a plurality of sub-categories which defined as a second layer, and a layer unit that can optionally show or hide the sub-categories respectively.

14. An alive patent map which is produced by the method described in claim 1, comprising at least one filtering unit, and at least one selected filtering condition, the matrix program creating a filtering result according to the filtering condition, and the filtering result being displayed in an intersection column formed by two axes.

15. The alive patent map according to claim 14, wherein the filtering unit contains the information of an International Patent Classification number, a Collaborative Patent Classification number, an applicant, an inventor, a payment date, a laid-open date, a publication date, a filing country or a combination of the above, and that information listed above can be one or more filtering condition, or the filtering unit is at least one patent list selected in the patent matrix program, or the filtering unit is a specific paragraph of the patent document corresponding to the keyword, or the number of occurrences for the keyword, and those also can be set as the filtering condition, or the alive patent map includes a layer relationship consisting of a plurality of main categories which defined as a first layer, and a plurality of sub-categories which defined as a second layer, and a layer unit that can optionally show or hide the sub-categories respectively.

* * * * *